(12) United States Patent
Salem

(10) Patent No.: US 11,915,284 B2
(45) Date of Patent: Feb. 27, 2024

(54) PRODUCT AUTHENTICATION SYSTEM AND COMPUTER IMPLEMENTED METHOD

(71) Applicant: Raied Esa Salem, Claremont, CA (US)

(72) Inventor: Raied Esa Salem, Claremont, CA (US)

( * ) Notice: Subject to any disclaimer, the term of this patent is extended or adjusted under 35 U.S.C. 154(b) by 0 days.

(21) Appl. No.: 15/846,169

(22) Filed: Dec. 18, 2017

(65) Prior Publication Data

US 2018/0374130 A1 Dec. 27, 2018

Related U.S. Application Data

(60) Provisional application No. 62/459,604, filed on Feb. 15, 2017, provisional application No. 62/435,708, filed on Dec. 16, 2016.

(51) Int. Cl.
*G06Q 30/00* (2023.01)
*G06Q 30/0601* (2023.01)

(52) U.S. Cl.
CPC ..... *G06Q 30/0609* (2013.01); *G06Q 30/0641* (2013.01)

(58) Field of Classification Search
CPC ............... G06Q 30/0609; G06Q 30/0641
USPC .................................. 705/26.1–27.2
See application file for complete search history.

(56) References Cited

U.S. PATENT DOCUMENTS

2003/0200156 A1\* 10/2003 Roseman ........... G06Q 30/0641
705/26.44
2014/0143090 A1\* 5/2014 Deyle ................ G06Q 10/0833
705/26.35

OTHER PUBLICATIONS

Christos Douligeris; Dimitrios N. Serpanos, "Security in EServices and Applications," in Network Security: Current Status and Future Directions, IEEE, 2007, pp. 157-177, doi: 10.1002/9780470099742.ch10. (Year: 2007).\*

\* cited by examiner

*Primary Examiner* — Anand Loharikar
(74) *Attorney, Agent, or Firm* — Stephen W. Aycock, II; Cygnet IP Law

(57) ABSTRACT

Methods, systems and computer readable media for product authentication are described.

4 Claims, 6 Drawing Sheets

PRODUCT AUTHENTICATION SYSTEM AND COMPUTER IMPLEMENTED METHOD

TECHNICAL FIELD

Embodiments relate generally to computerized electronic commerce systems, and more particularly, to methods, systems and computer readable media for authenticating products.

BACKGROUND

Counterfeit goods are a significant problem to manufacturers of genuine and authentic goods and to consumers concerned about inadvertently buying counterfeit goods. Fear of buying a counterfeit item may suppress buyer offer or bid prices in online marketplaces. An item that has been authenticated by an expert may fetch a higher price in an electronic commerce marketplace (e.g., EBAY, AMAZON, etc.). Embodiments disclosed were conceived in light of the above mentioned needs, problems, and/or limitations, among other things.

DETAILED DESCRIPTION

Figure 1:
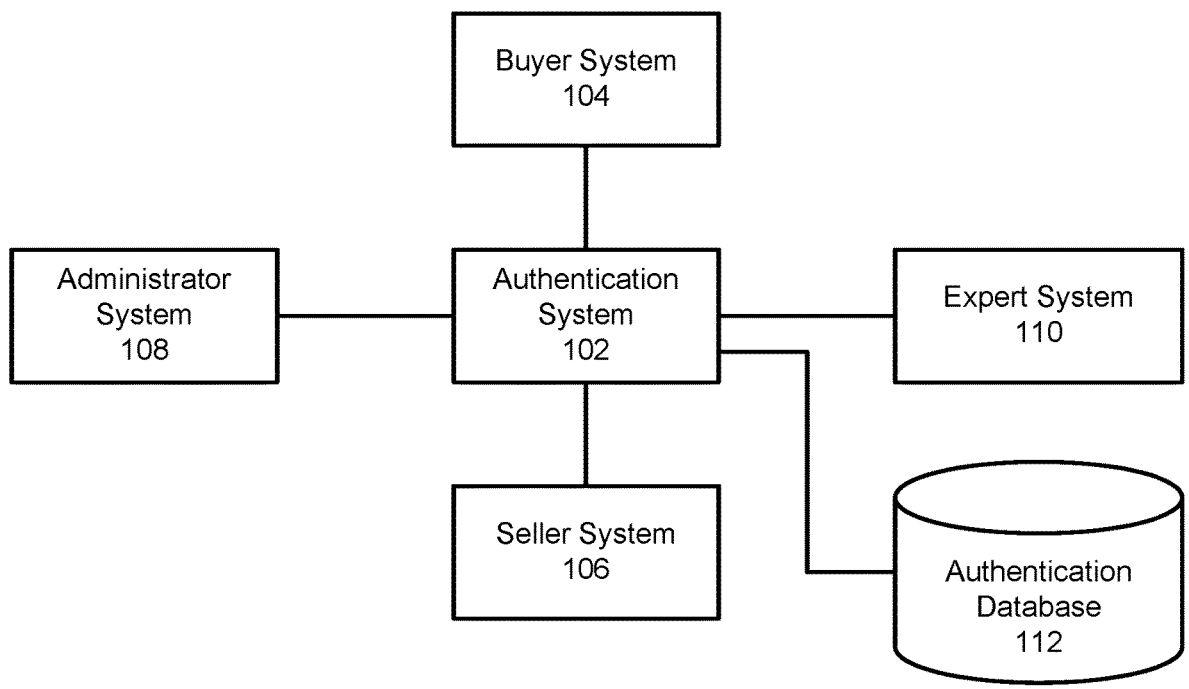
FIG. 1 is a diagram of an example product authentication system in accordance with at least one implementation.

FIG. 1 is a diagram of an example product authentication environment 100 in accordance with at least one implementation. The environment 100 includes an authentication system 102, a buyer system 104, a seller system 106, an administrator system 108, an expert system 110, and an authentication database 112.

In operation, the authentication system can provide graphical user interfaces (e.g., via a web server) to the other systems (e.g., one or more of 104-110) and can perform one or more of the functions shown in FIGS. 2-4 and FIG. 6 and described below.

The authentication system 102 can include a server, a desktop computer, a portable computer, a mobile device, or the like. The buyer system 104, the seller system 106, the administrator system 108, and the expert system 110 can include a desktop computer, a portable computer, a mobile device, or the like.

Figure 2:
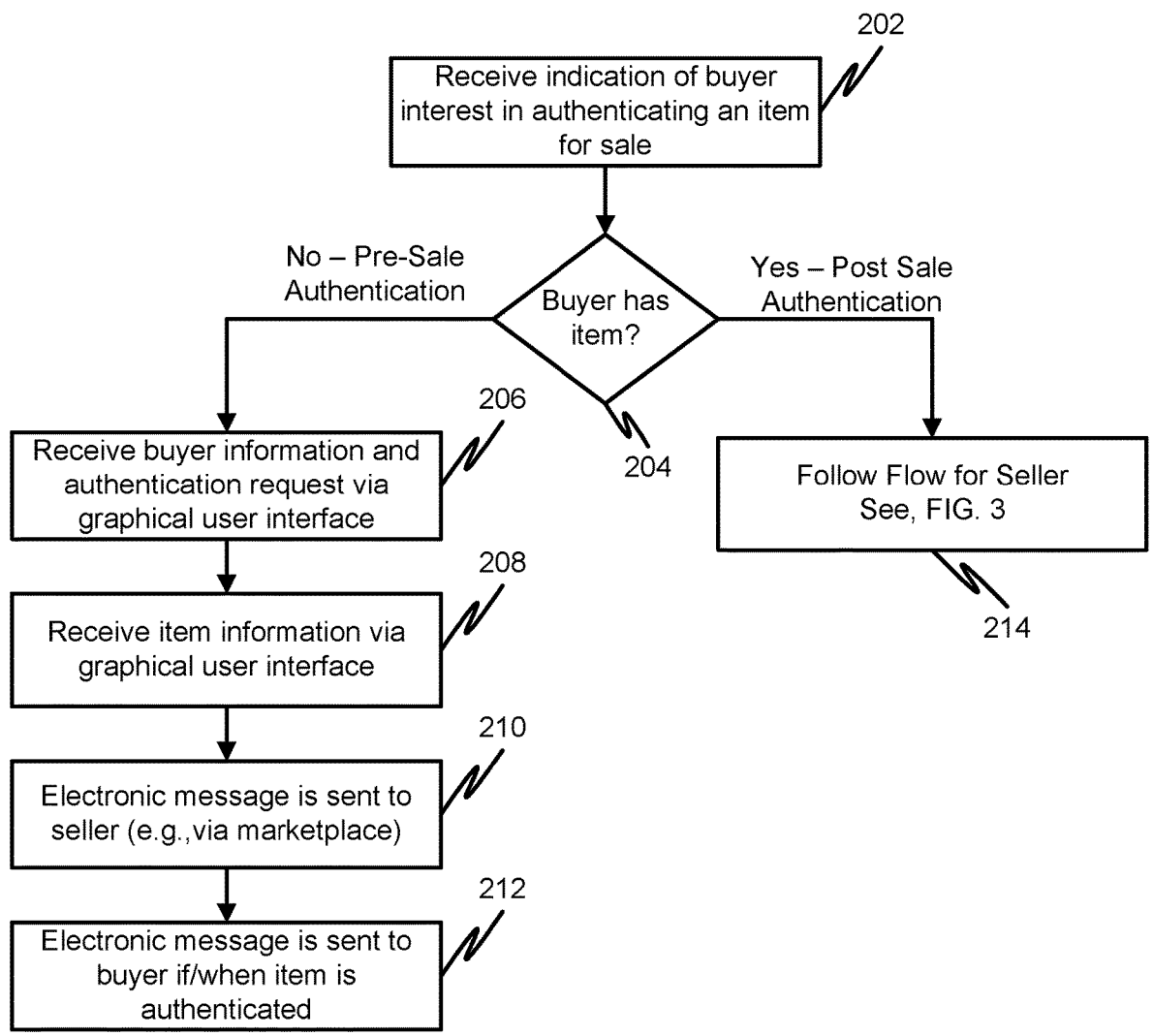
FIG. 2 is a flow chart of an example method of authenticating an item in accordance with at least one implementation.

FIG. 2 is a flow chart of an example method of authenticating an item in accordance with at least one implementation. The method begins at 202, where an indication of buyer interest in authenticating an item is received. The indication can include an electronic message from a buyer system to an authentication system via a user interface on the buyer system for requesting item authentication. The user interface could be a user interface element (e.g., an authenticate button) in a web page (e.g., an item sale listing page) displayed by an electronic commerce system. Processing continues to 204.

At 204, the system determines whether the buyer has the item or not. If the buyer has the item, the authentication could be considered a post-sale authentication and processing continues to 214. If the buyer does not have the item, the authentication could be considered a pre-sale authentication and processing continues to 206.

At 206, the authentication system receives buyer information and the authentication request (e.g., via a graphical user interface provided by the authentication system and displayed on the buyer system). Buyer information can include one or more of the following: name, email address, website, or online marketplace where the item is being offered for sale (e.g., AMAZON, EBAY, CRAIGSLIST, POSTMARK, MERCARRI, etc.). The buyer can also establish a user name and password for his/her account in the authentication system. Processing continues to 208.

At 208, information regarding the item for which authentication has been requested by the buyer is received at the authentication system. The item information can include listing number or other identifier, seller identifier, etc. that can be used to identify the item within the system that is it being sold through (e.g., AMAZON, EBAY, etc.). Processing continues to 210.

At 210, an electronic message is sent from the authentication system to the seller to let the seller know that a buyer or potential buyer has requested authentication of the item. The message can include the item identifier and the ecommerce system in which the item is being offered for sale. The message can be sent via email, text message, or via a messaging system associated with the ecommerce platform on which the item is being offered for sale. Processing continues to 212.

At 212, an electronic message is sent to the buyer or prospective buyer when the item is being authenticated and, optionally, when the authentication opinion has been provided.

At 214, because the buyer has the item in hand, the buyer is more akin to a seller for authentication system purposes as described herein. Accordingly, the buyer is directed to a seller process flow (e.g., as shown in FIG. 3 and described below).

Figure 3:
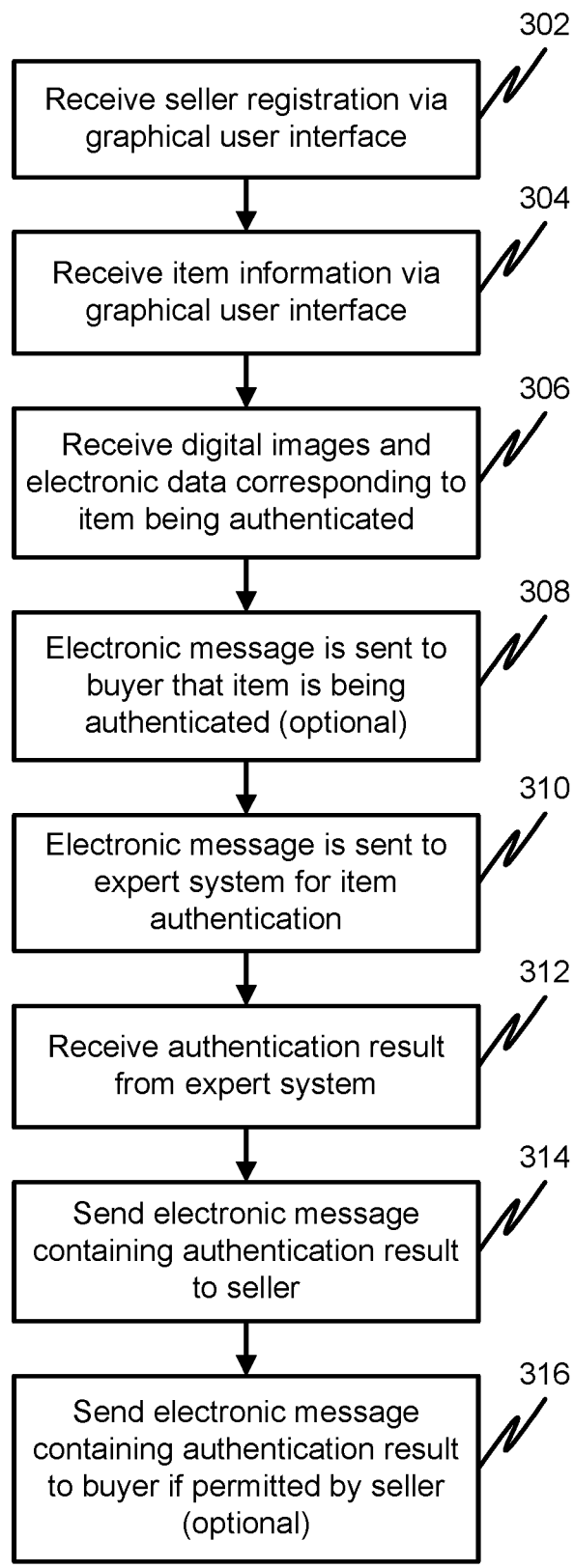
FIG. 3 is a flow chart of an example method of registering and qualifying an expert for product authentication in accordance with at least one implementation.

FIG. 3 is a flow chart of an example method of registering and qualifying an expert for product authentication in accordance with at least one implementation. Processing begins at 302, where a seller registration request is received via a graphical user interface. The seller registration request can include seller information such as one or more of the following: name, address, phone number, email address, item categories that the seller sells in and may want to authenticate products for, ecommerce websites or marketplaces the seller uses (e.g., AMAZON, EBAY, CRAIGSLIST, POSTMARK, MERCARRI, etc.). Additionally, the seller may pay for the authentication service according to a payment system. The authentication payment system can be based on credits. For example, an item up to $100 in value can be authenticated for 1 credit. Each additional $100 in value may require an additional half credit. For used items, each additional $100 in value may cost ⅛ credit. Credits can be purchased individually (e.g., for $9.95), or in bulk (e.g., 10 credits for $89.95 or 100 credits for $795). Processing continues to 304.

At 304, item information is received via a graphical user interface. The item information can include item identifier, website or marketplace, seller user ID in website or marketplace, etc. Processing continues to 306.

At 306, digital images and optionally other electronic data corresponding to the item to be authenticated are received from the seller system. The digital images can include images of the item to be authenticated, where the images are taken according to instructions provided by the authentication system (e.g., front picture, top picture, left side picture, right side picture, etc.). The other electronic data can include information about the item entered by the seller, such as style number, serial number, source of the item, or other information about the item that may be useful to, or requested by, an authentication expert. Processing continues to 308.

At 308, an electronic message is optionally sent to the buyer to inform the buyer that an authentication is in progress. The seller can authorize this message to be sent. The authentication in progress message may serve to keep the buyer interested in the item while the authentication opinion is being prepared. Processing continues to 310.

At 310, an electronic message is sent to an expert system for item authentication. The message may go to a given expert system based on the item category and/or manufacturer. Alternatively, the message may go to a group of expert authenticators, where one (or possibly more) of the authenticators selects the message and performs the authentication. Processing continues to 312.

At 312, an authentication opinion result is received at the authentication system from the expert system. The opinion result can be in the form of an electronic message. The opinion can include a confidence value (e.g., a percentage) of confidence that the expert authenticator has that the item is authentic or not. In addition to the item images and information, various other factors can be used by the expert authenticator, such as which site the item is listed for sale on, the seller's experience and/or rating, etc. Processing continues to 314.

At 314, an electronic message containing the authentication opinion result can be sent to the seller. The authentication opinion result can include an opinion of whether an item is authentic, the confidence of that opinion, and the factors considered relevant to the opinion.

Processing continues to 316.

At 316, an electronic message is optionally sent to the buyer (e.g., if permitted and/or requested by the seller) and/or to a machine learning system. The machine learning system can be configured to collect information on authentication requests and results in order to train a computerized expert system with human expert opinions.

Figure 4:
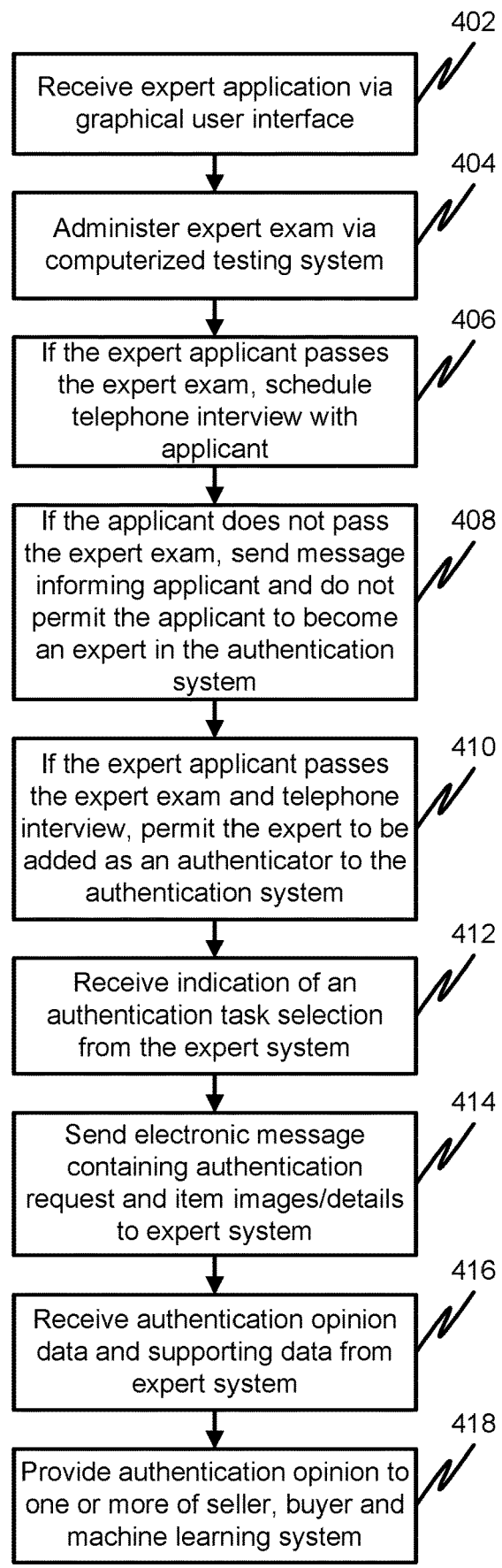
FIG. 4 is a flow chart of an example method of providing a product authentication opinion in accordance with at least one implementation.

FIG. 4 is a flow chart of an example method of providing a product authentication opinion in accordance with at least one implementation. Processing begins at 402, where an application from an expert is received. The application can include information such as name, address, phone number, email address, and subject matter areas in which the applicant considers himself or herself to be an expert in. Processing continues to 404.

At 404, the applicant is given an expert qualification examination via a computerized testing system (e.g., network based or via local computer). The qualification examination can include questions developed with the help of another expert in the product category that the qualification examination pertains to. The questions can include visual authentication questions presented using pictures of authentic and counterfeit goods. Processing continues to 406.

At 406, if the applicant passes the expert qualification examination, a telephone interview is arranged for the applicant. Processing continues to 408.

At 408, if the applicant does not pass the expert qualification examination, an electronic message is sent to inform the applicant. Also, the applicant may not be permitted to re-apply for a given time period (e.g., 6 months.). Processing continues to 410.

At 410, if the applicant passes the expert qualification examination and the telephone interview, the applicant is permitted to register as an expert with the authentication system. Processing continues to 412.

At 412, an indication of an authentication task selection is received at the authentication system from an expert system. For example, the indication could be based on the expert accepting an authentication request from the authentication system or based on the expert selecting one or more authentication tasks from a pool of available authentication tasks in the authentication system. Processing continues to 414.

At 414, an electronic message containing the authentication request and item images and other information is sent to the expert system. Processing continues to 416.

At 416, authentication opinion data is received at the authentication system from the expert system. The opinion data can include the opinion of the expert as to whether the item is authentic, an optional confidence value in the opinion, and optional factors supporting the opinion. Processing continues to 418.

At 418, the authentication opinion is provided from the authentication system to the seller and, optionally, to the buyer and/or a machine learning system (as described above). In some implementations, providing the authentication opinion can include providing an "Authentication Seal" (e.g., a digital design or logo) that can be placed manually (or automatically) in a listing for the item that was authenticated. The seal can be hyper linked so that a prospective buyer can click on the authentication seal and be forwarded to the authentication system website for a confirmation of the authentication showing the item, the seller, and the grade the item was given by the authentication service. Also, after the authentication is complete, an optional rating and feedback system can be provided in which the buyer and an administrator rate the expert (e.g., according to a 5 star rating system). The buyer's feedback and the rating of the expert may be made public, while the administrator's feedback may be kept private between the administrator and the expert for quality control and process improvement.

Some implementations can include a product tag (e.g., RFID, barcode, or other machine or human readable indicium) that can be applied to the product once it is authenticated, where the tag includes a unique authentication system number or identifier that corresponds to that product or item.

Figure 5:
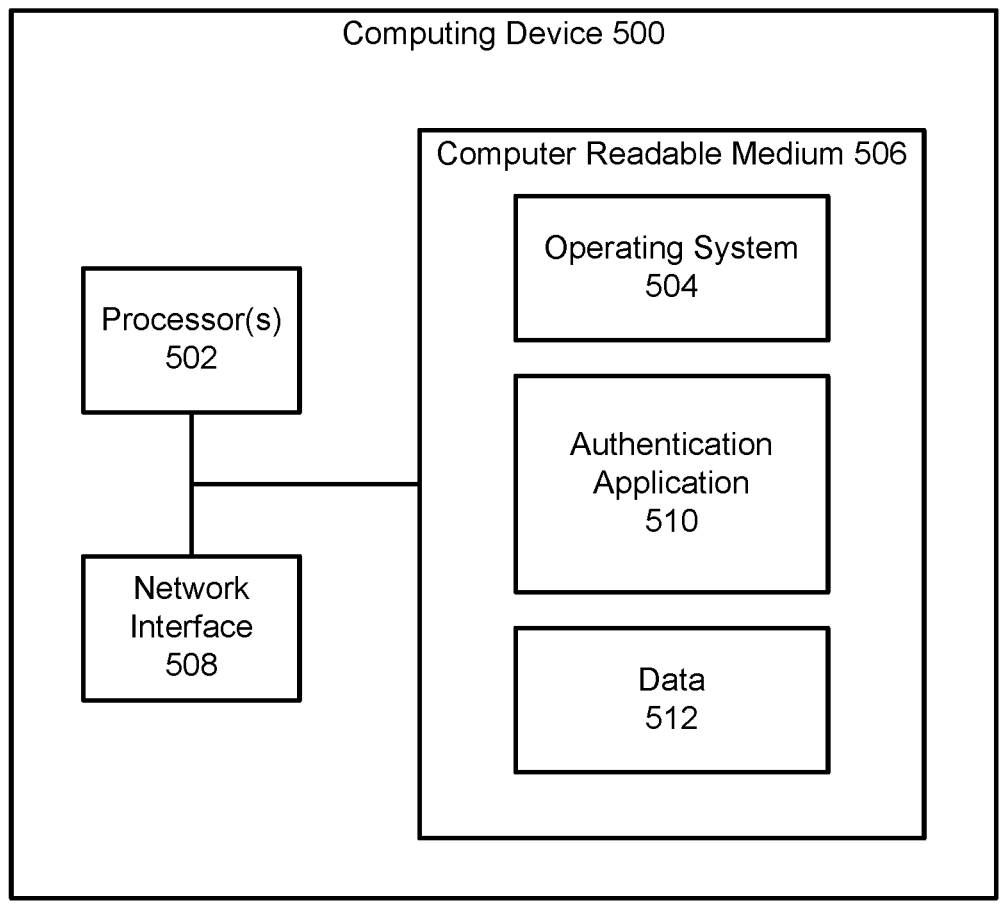
FIG. 5 is a diagram of an example computing device configured for product authentication in accordance with at least one implementation.

FIG. 5 is a diagram of an example computing device 500 in accordance with at least one implementation. The computing device 500 includes one or more processors 502, a nontransitory computer readable medium 506, and a network interface 508. The computer readable medium 506 can include an operating system 504, an authentication application 510, and a data section 512 (e.g., for storing seller information, item information, expert information, buyer information, authentication opinion information, etc.).

In operation, the processor 502 may execute the application 510 stored in the computer readable medium 506. The application 510 can include software instructions that, when executed by the processor, cause the processor to perform operations for product authentication in accordance with the present disclosure (e.g., performing one or more of 202-214, 302-316, 402-418, and/or 602-604 described herein).

The application program 510 can operate in conjunction with the data section 512 and the operating system 504.

Figure 6:
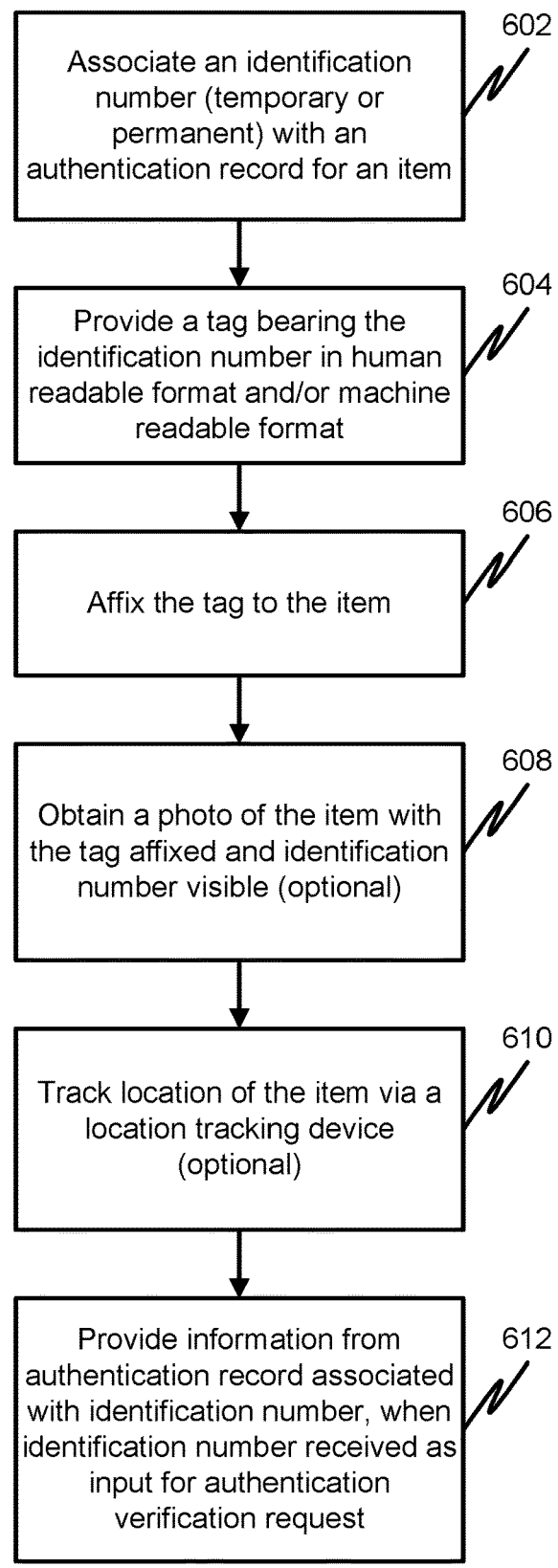
FIG. 6 is a flow chart of an example method of providing a product authentication opinion in accordance with at least one implementation.

FIG. 6 is a flow diagram of an example method for authentication identification, tracking, and verification in accordance with some implementations. Processing begins at 602, where an identification number is associated with an authentication record for an item. The identification number can be a unique number associated with the authentication record for the item. The identification number can be a temporary identification number or a permanent identification number. A temporary identification number is one that may be valid only for a given time period after activation (e.g., 30 days, 60 days, 90 days, up to 365 days, etc.). A permanent identification number is one that remains valid indefinitely or remains valid longer than the given time period of validity for a temporary identification number. The length of time for which an authentication identification number may be valid can correspond to the level of service purchased by the seller. For example, a low level of authentication can be sold to a seller for a lesser price than a higher level of authentication. The lower level authentication may have an identification number that is temporary (or that expires within a given time period). A higher level authentication service can include an identification number that has a longer expiration period or that may never expire (e.g., be permanent). Processing continues to 604.

At 604, a tag bearing the identification number in human readable format, computer readable format, or both is generated and provided. The human readable format can include printed alphanumeric characters, symbols, or the like. The computer readable format can include a bar code (2D, 3D, QR code, etc.), a radio frequency ID (RFID) tag, a near field device, a Bluetooth device (e.g., Bluetooth low energy, standard Bluetooth, etc.), or the like. Processing continues to 606.

At 606, the tag is affixed to the item for which the authentication record was generated. The tag can be affixed manually (e.g., by using a zip tie or the like) or affixed by a machine using a suitable tag attachment device. Processing continues to 608.

At 608, a photo of the item showing the tag affixed with the human readable and/or machine readable identification number visible in the photo is optionally obtained. For example, an authenticator or approved vendor may affix the tag and take an image of the item with the tag affixed and showing the identification number. The image with the tag and the visible identification number could then be included in a listing for the item (e.g., a fixed price or auction type sales listing on an ecommerce website, etc.). The image with the tag affixed to the item can also be provided to the authentication service, where the image can be stored as part of the authentication record for the item. Processing continues to 610.

At 610, a location of the item is optionally tracked. The tracking can be accomplished via a location device such as a global positioning system (GPS) receiver, an RFID tag, a Bluetooth device, a beacon signal receiver, or the like. The location device can be a device that is capable of determining location information or a device that permits an external system to determine the location of the item. The location device can be a separate device or integrated into the tag. Processing continues to 612.

At 612, information from the authentication record associated with the identification number is provided in response to a query including the identification number. For example, a prospective buyer of an item can view an image of the item in a listing on an ecommerce website and note the identification number. The prospective buyer can then enter the identification number into a website of the authentication service as part of a query for authentication information. In response, the authentication service website could respond with some or all of the information from the authentication record. For example, the authentication service can respond with an image of the item having the authentication identification number visible in the image on a tag affixed to the item. The authentication service can also respond with information about the authentication.

In another example, the identification number could be associated with a hyperlinked user interface element (e.g., a graphic seal or badge, a text link, etc.) displayed in a sales (or rental) listing for the item. When a prospective buyer clicks the hyperlinked user interface element, the prospective buyer could be redirected to the authentication service website where authentication information for the item associated with the identification number is displayed. Alternatively, another user interface element (e.g., a pop-up box, etc.) containing authentication information could be displayed when the prospective buyer clicks the hyperlinked user interface element.

In yet another example, when a seller is creating the listing for an item that has been authenticated, the authentication identification number for that item could be entered at the ecommerce website where the listing is being created and the ecommerce platform could connect with the authentication service and retrieve the authentication record information associated with the identification number entered by the seller. The retrieved authentication information can be optionally inserted into the listing for the item and optionally indicated as having been retrieved by the ecommerce platform directly from the authentication service (and thus having more credibility, potentially).

Authentication record information can include, but is not limited to, the item name, the item manufacturer details, style or model number, serial number, date of manufacture, color, size, material, authenticator notes, authenticator identification number, authenticator name, authentication date, images obtain during authentication, location information, previous or current sales or sales listing information, etc.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for product authentication.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A computer-implemented method comprising:
receiving, at the authentication system, item information via the graphical user interface;
receiving, at the authentication system, digital images or electronic data corresponding to the item to be authenticated are received from the seller system;
receiving, at the authentication system, a payment from the seller;
sending an electronic message from the authentication system to an expert system for item authentication, wherein the expert system comprises a group of expert authenticators, wherein one or more of the expert authenticators selects the electronic message and authenticates the digital images or electronic data corresponding to the item to be authenticated to generate an opinion;
receiving an authentication opinion result electronic message at the authentication system from the expert system;
sending an electronic message containing the authentication opinion result to the seller system;
generating automatically an authentication tag including a machine-readable indicium that includes an encoded authentication system reference number that is associated with the authentication opinion result store in a database of the authentication system, wherein the encoded authentication system reference number is one of a permanent reference number or a temporary reference number, and wherein the temporary reference number is valid for a given time period after activation of the temporary reference number;
receiving an image of the item with the authentication tag affixed to the item;
storing the image of the item with the authentication tag affixed to the item in the database;
receiving a request for the authentication opinion result, wherein the request for the authentication opinion result includes a human readable identification number that corresponds to the authentication opinion results corresponding to the encoded authentication system reference number; and
in responses to receiving the request for the authentication opinion result, providing at least part of the authentication opinion result to a system from which the request for the authentication opinion result was received,
wherein the expert system comprises a group of expert authenticators, wherein one or more of the expert authenticators selects the electronic message and authenticates the digital images or electronic data corresponding to the item to be authenticated to generate an opinion.

2. The computer-implemented method of claim 1, further comprising:

receiving and storing a buyer rating and buyer feedback of the authentication opinion.

3. The computer-implemented method of claim 1, wherein the authentication tag is valid for a predetermined duration, and wherein the predetermined duration is determined by a prespecified authentication level of service purchased by the seller.

4. The computer-implemented method of claim 1, further comprising:

sending an electronic message from the authentication system to a buyer indicating that authentication is in progress.

\* \* \* \* \*